(12) United States Patent
Nilsson et al.

(10) Patent No.: US 7,765,773 B2
(45) Date of Patent: Aug. 3, 2010

(54) SYSTEM AND METHOD FOR PRODUCING A PACKAGING LAMINATE AND PACKAGES MADE FROM THE PACKAGING LAMINATE

(75) Inventors: Tommy Nilsson, Eslöv (SE); Håkan Svenson, Landskrona (SE); Anette Lantz, legal representative, Landskrona (SE); Hans Johansson, Lomma (SE); Lars Bergholtz, Höganäs (SE); Claes Ingvert, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 187 days.

(21) Appl. No.: 11/817,540

(22) PCT Filed: Jan. 27, 2006

(86) PCT No.: PCT/SE2006/000120
§ 371 (c)(1),
(2), (4) Date: Nov. 2, 2007

(87) PCT Pub. No.: WO2006/093447
PCT Pub. Date: Sep. 8, 2006

(65) Prior Publication Data
US 2009/0000250 A1    Jan. 1, 2009

(30) Foreign Application Priority Data
Mar. 2, 2005    (SE)    .................... 0500471

(51) Int. Cl.
*B65B 57/02*    (2006.01)
*B31B 1/00*    (2006.01)
(52) U.S. Cl. .................... 53/396; 53/53; 53/65; 493/16
(58) Field of Classification Search .................... 53/396, 53/51–53, 65; 493/11, 12, 16
See application file for complete search history.

(56) References Cited

U.S. PATENT DOCUMENTS

| | | | | |
|---|---|---|---|---|
| 3,237,973 | A | * | 3/1966 | Rumberger .................... 53/51 |
| 4,054,474 | A | * | 10/1977 | Collins et al. .................. 53/442 |
| 4,387,614 | A | | 6/1983 | Evans |
| 4,455,810 | A | * | 6/1984 | Kreager et al. .................. 53/65 |

(Continued)

FOREIGN PATENT DOCUMENTS

GB    2 363 252 A    12/2001

(Continued)

OTHER PUBLICATIONS

International Search Report for PCT/SE2006/000120 dated May 12, 2006.

*Primary Examiner*—Stephen F Gerrity
(74) *Attorney, Agent, or Firm*—Buchanan Ingersoll & Rooney PC

(57) ABSTRACT

A system and a method for production of a packaging laminate that comprises a layer containing magnetizable particles. The method involves marking faults, such as single spot defects and splices, on the packaging laminate by the application of a magnetic field to make a magnetic mark on the packaging laminate. A packaging device is arranged to sense the presence of the magnetic mark related to a package made from the packaging laminate.

10 Claims, 3 Drawing Sheets

U.S. PATENT DOCUMENTS

| | | | |
|---|---|---|---|
| 4,792,392 A * | 12/1988 | Belgian | 209/3.3 |
| 4,945,252 A * | 7/1990 | Lerner et al. | 250/548 |
| 5,316,857 A | 5/1994 | Spiegel | |
| 5,458,062 A | 10/1995 | Goldberg et al. | |
| 5,873,966 A | 2/1999 | Goldberg et al. | |
| 7,222,472 B2 * | 5/2007 | Spatafora et al. | 53/396 |
| 2005/0287351 A1 * | 12/2005 | Johansson et al. | 428/323 |

FOREIGN PATENT DOCUMENTS

| | | |
|---|---|---|
| JP | 58-162685 A | 9/1983 |
| WO | WO 00/23275 A1 | 4/2000 |
| WO | WO 03/095198 A1 | 11/2003 |

* cited by examiner

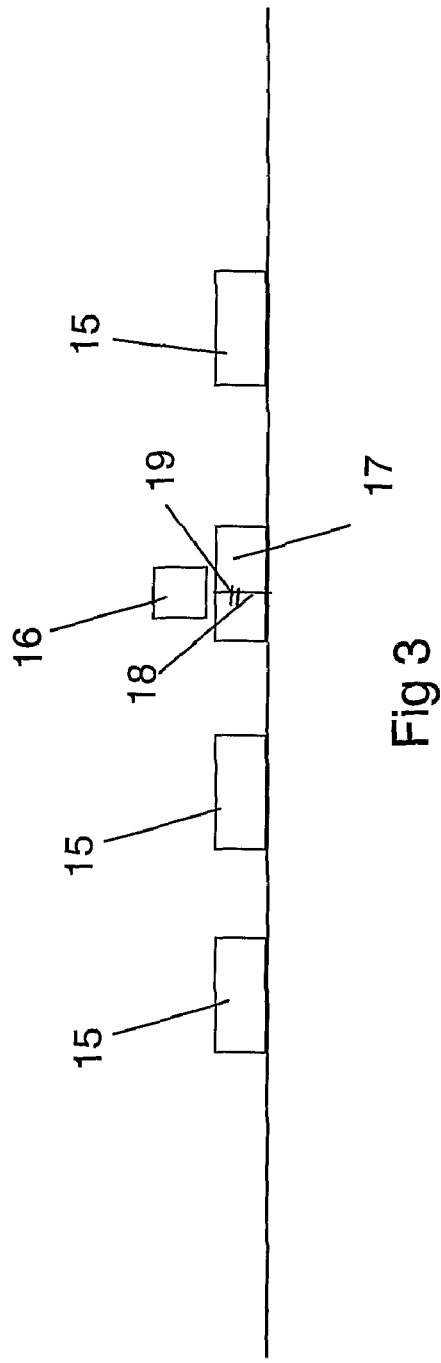
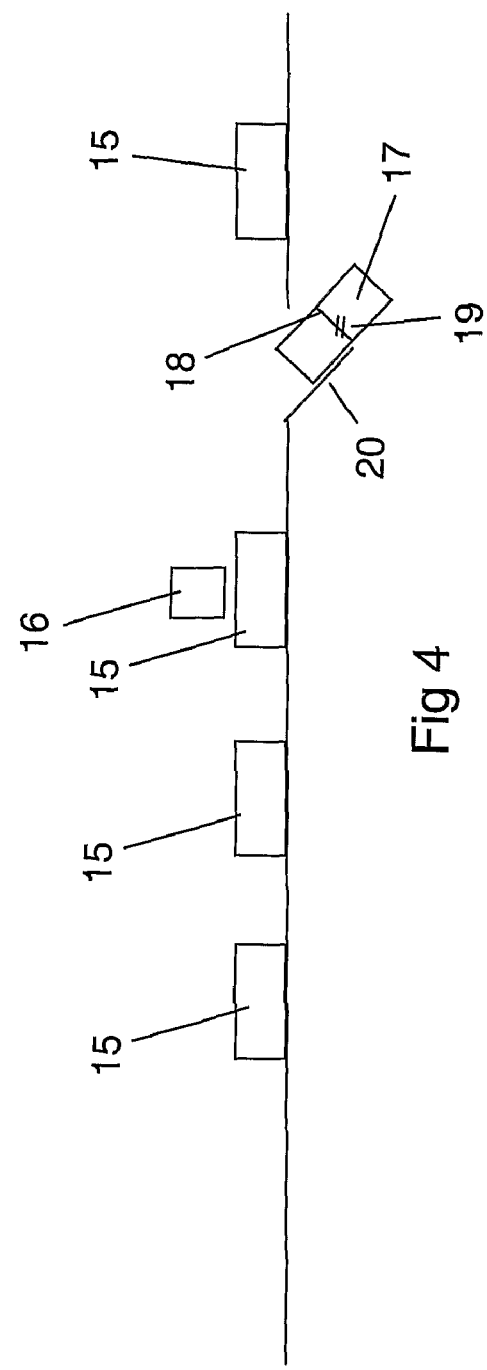

SYSTEM AND METHOD FOR PRODUCING A PACKAGING LAMINATE AND PACKAGES MADE FROM THE PACKAGING LAMINATE

TECHNICAL FIELD OF THE INVENTION

The present invention relates to a system and a method for production of a packaging laminate. The invention further relates to a method and a packaging device for production of packages.

BACKGROUND ART

When producing packaged food products, especially those which are commercially sterilised or treated for extended shelf life, it is important that the packaging laminate or material does not contain any defects or splices which could jeopardize the quality of the packaged product. Defects can arise during the production of the packaging material, and it is important that packages containing defective packaging material are sorted out.

At the production of a packaging laminate, a roll, which e.g. is about 1.5 m wide and about 4000 m long, of cardboard material is fed into a laminator for laminating with plastic and commonly also aluminum. In the laminator, spotwise oxidation of the plastic can occur or small particles might unintentionally be laminated in the packaging material.

Defects which arises from spotwise oxidation or particles in the laminator are known as single spot defects. An image scanner or a laser scanner present in the laminator detects defects and marks their location on the packaging material, commonly by adding a piece of adhesive tape to the rim of the packaging material.

At a later stage in the production, the packaging material goes through a manual doctoring procedure, wherein the piece of tape is manually located, the defect is inspected and a decision is taken on whether it should be cut away and a splice be performed or if it is insignificant and no measures have to be taken. If a splice is made, the package which in the end contains this splice must be discarded.

Splicing is also performed in a slitting unit, wherein the packaging laminate is cut into rolls of a proper width and length for use in a filling machine, e.g. rolls that can be 30 cm wide and 800 m long. Obviously it is sometimes necessary to perform a splice to produce rolls that have the correct length.

Splicing also occurs in the packaging machine. It is performed by the operator when a roll of packaging laminate is near its end, and a new roll of packaging laminate is spliced to the one presently in the machine to obtain continuous production.

Later on, in the packaging machine, the web of packaging laminate is passed between two opposite rolls, and the presence of the splice is detected by the rolls as a change of thickness in the packaging laminate. To facilitate this, the web has to be flat to ensure contact between the web and the rolls. The detection also has to be performed upstream of any sterilisation treatment of the web, since the rolls are in contact with the web, and, thus, would compromise the sterility of the web. However, the rolls work fairly well for a thicker material. For a thin packaging laminate the difference in thickness is smaller and more difficult to detect in this manner.

The detected position of the splice is stored in the memory of the packaging machine control system, and when the packaging laminate has been transformed into individual packages, the package which is deemed to contain the splice is discarded together with the package before and the package after.

Since the splice detection is performed early in the packaging machine, i.e. prior to sterilisation and forming, the web of packaging laminate has a certain way to travel through the packaging machine before the discarding of the package containing the splice takes place. During this travel there is always a risk of a certain dislocation of the web which leads to some uncertainty as regards the exact position of the splice, i.e. in which package it is located.

Because of this, the measure is taken of throwing out three packages, instead of just the one which should contain the splice, even though this leads to unnecessary loss of product.

As is apparent from the above, there is a need for an improvement as regards the handling of defects and splices, both as regards better certainty when discarding packages to achieve less unnecessary loss of product, and as regards better certainty in the detection of the splices, especially when a thinner packaging laminate is used.

SUMMARY OF THE INVENTION

It is an object of the present invention to provide a method and a system for producing a packaging laminate, wherein the position of faults, such as defects and splices, can be indicated in such a manner that the information can be transmitted to a system for producing packages, i.e. a filling machine.

Another object of the present invention is to provide a method and a system for producing packages made of the packaging laminate, wherein packages with faults easily and effectively can be sorted out and discarded.

The inventive system for production of a packaging laminate, including a layer comprising magnetisable particles, comprises at least one magnetising means for applying a magnetic field for making a magnetic mark in the packaging laminate indicative of the location of a fault such as a splice or a single spot defect.

A magnetic mark in this context means that an amount of the magnetisable particles in the packaging laminate are magnetised to emit a magnetic field which is different from the field emitted by the particles outside the magnetic mark, which could be a field of zero magnetism (i.e no magnetic field at all). Other combinations of fields emitted by the magnetic mark and the particles surrounding the magnetic mark are also possible, the important thing is that the field emitted by the magnetic mark is different from the field emitted by the surrounding magnetisable particles.

This system provides an efficient and easy way of marking the location of faults in the packaging material.

The system also has the advantage that it makes it possible to dispense with doctoring operations. Instead of cutting away a defect, such as a single spot defect, and making a splice, which has to be detected mechanically later in the packaging machine, a magnetic mark is made which is indicative of the defect. This mark can be detected later on by equipment in the packaging machine. Thus, even though just as many packages with faults in the packaging material (in this case singe spot defects instead of splices made during doctoring) are manufactured by the producer of the packaged food product, the production of the packaging laminate is faster.

Doctoring could be used with this system as well, the splicing unit used in the doctoring is then equipped with a magnetising device, preferably in the form of a permanent magnet.

Splices that are made in the slitting unit and in the packaging device are marked in the same way.

Thus, the marking of all splices is accomplished in an efficient and automatically detectable manner.

Preferably, the system comprises a scanner for detecting fault such as single spot defects, wherein the scanner is arranged to activate a first magnetising means, preferably in the form of a electromagnet, so that a magnetic mark is made at the detection of such a fault.

A scanner can perform inspection of the laminate at an advantageously high speed. The electromagnet is advantageous since it can be activated and deactivated at an instant by an electric current, thus being capable of making a magnetic mark at the correct position when activated by the scanner.

Further, the invention relates to a packaging device for production of packages made of a packaging laminate produced by the inventive system, which packaging device is provided with a magnetic sensor for sensing the presence of magnetic marks indicative of a fault such as a splice or a single spot defect on a package.

This detection of defect packages is independent of the thickness of the packaging material, and is fast and efficient. Since the certainty as regards which package contains a splice is much higher than with prior art devices, it is possible to lessen the product losses and only discard one package instead of three.

Preferably, the packaging device further comprises means for discarding a package whereon the magnetic sensor senses at least one magnetic mark indicative of a fault such as a splice or a single spot defect on that package. This means that the defective packages are sorted out from the production line and it is ensured that no defect packages are shipped to the end customer.

The phrase magnetising means are to be interpreted as a permanent magnet or a electromagnet or other means able to perform manipulations of the magnetisable particles in the laminate to produce a detectable magnetic mark.

These and other aspect of the invention will be apparent from and elucidated with reference to the embodiments described hereinafter.

BRIEF DESCRIPTION OF THE DRAWINGS

FIG. 3 schematically shows part of a first embodiment of an inventive packaging device in a first state.

FIG. 4 schematically shows part of the device in FIG. 3 in a second state.

DETAILED DESCRIPTION OF PREFERRED EMBODIMENTS OF THE INVENTION

Figure 1:
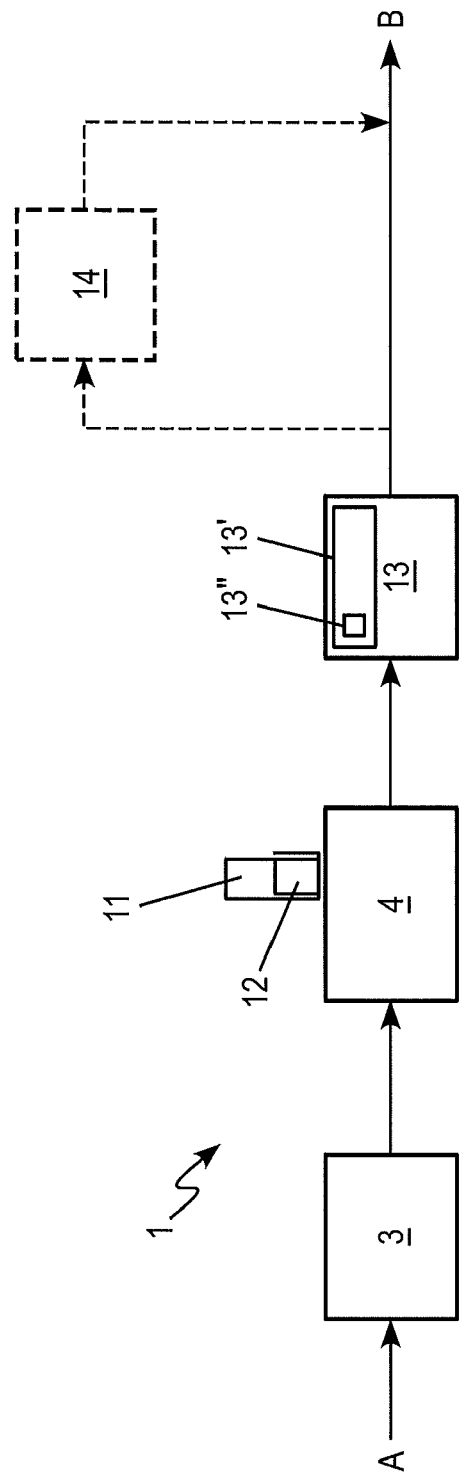
FIG. 1 schematically shows an inventive system for producing a packaging laminate.

A system 1 for producing a packaging laminate is shown in FIG. 1. A roll of cardboard material 2 is fed into the system at A. A printing press 3 prints a desired image décor on the input cardboard material. The printed cardboard material is fed into a laminator 4, wherein it is laminated with layers of plastic 5, 6 and 7 and a layer of aluminum 8. At least one of the plastic layers or the printing press comprises magnetisable particles 9, commonly particles of magnetite.

Figure 2:
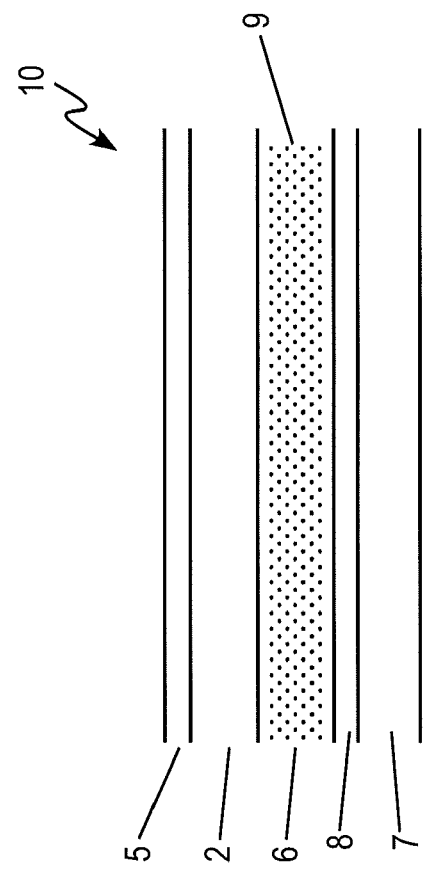
FIG. 2 shows a packaging laminate with a layer comprising magnetisable particles.

The aggregate of the cardboard material and the laminated layers constitutes a packaging laminate which is shown in more detail in FIG. 2. Layer 2 is the cardboard material, and a plastic décor layer 5 is coated on top of this to protect the image printed on that side of the cardboard material 2 in the printing press 3.

An aluminum layer 8 is laminated on the other side of the cardboard material by means of a plastic layer 6 containing magnetisable particles 9. Finally a plastic layer 7 is laminated on the aluminum layer 8. The plastic layer 7 will be on the inside of the final package and the décor layer 5 will be on the outside.

Variations of the layers and composition of the packaging laminate are of course possible as well as alternative processes for the production and are all within the scope of this invention.

In the laminator 4, the packaging laminate 10 is scanned for defects by an scanner 11. When a defect is detected, such as a spotwise oxidation of the laminated plastic, an electromagnet 12 is activated and applies a magnetic field to the packaging laminate to magnetise an amount of the magnetisable particles 9 to make a magnetic mark on the packaging laminate to indicate the location of the defect.

After the laminator, the packaging laminate is fed into a slitting unit 13, wherein it is cut and wound into rolls of commonly about 30 cm width and 800 m length. These rolls of packaging laminate are then palletised at B and shipped to the site of a customer producing a packaged food product.

In the slitting unit 13, a splicing unit 13' is provided which allows the splicing of the packaging material when this is needed. The splicing unit has a permanent magnet (magnetizing means) 13" which is moved towards the packaging laminate for applying a magnetic field to magnetize an amount of the magnet sable particles to mark the location of the splice. The permanent magnet could for instance be located in a heating unit which is applied to the packaging laminate to melt an amount of the plastic layers to join the two lengths of packaging laminate.

As an option, a doctoring equipment 14, marked in dashed lines in FIG. 1, comprising a cutting blade and a splicing unit could be used to check the marked defects and cut away defects that are deemed to be so serious that it is desirable that they are not present in packaging laminate rolls shipped to a customer.

In that case the doctoring device is equipped with a magnetic sensor so that the magnetic mark made on the packaging laminate by the laminator can be utilised by the operator to quickly find the defect. This speeds up the doctoring as compared to prior art systems where the rolls of packaging laminate had to be manually inspected for the tape marking the position of the defect.

The defect is then inspected and depending on the seriousness the portion of the packaging laminate containing the defect can be cut off and a splice made to join the two cut apart lengths of packaging laminate. The splicing unit comprises a permanent magnet for making a new magnetic mark at the location of the splice.

The rolls of packaging laminate that have gone through the doctoring procedure are then palletised together with the ones that were without defects and are shipped to a packaging device as above in the system without the doctoring equipment.

The invention also relates to a packaging device.

According to a first embodiment of the packaging device, which is shown in FIGS. 3 and 4, the packages 15 manufactured in a conventional manner from the packaging laminate 10 passes a magnetic sensor 16, which senses the presence of a possible magnetic mark on the package. A package 17 in FIG. 3 contains a splice 18. The splice is marked by a magnetic mark 19, which in practice is invisible to the eye. However, it is shown in the figures for the sake of clarity.

The magnetisable particles 19 in the magnetic mark have in this case been magnetised by a permanent magnet in a splicing unit during the manufacturing of the packaging laminate. The magnetic mark 19 emits a magnetic field, different from the field emitted, if any, from the rest of the packaging material in the packages passing the magnetic sensor. This is sensed by the magnetic sensor 16.

When a magnetic mark 19 is detected by the magnetic sensor 16 on a package 17, a signal is sent to a discarding means, shown in the form of a flap 20, to open in order to remove the package 17 from the production line and discard it, as is shown in FIG. 4. The same thing happens should a magnetic mark indicative of a single spot defect be detected on a package.

Figure 5:
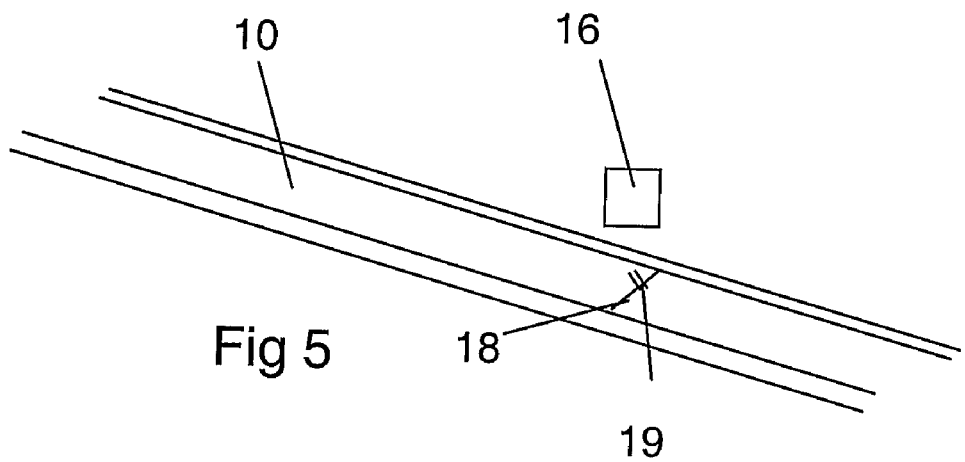
FIG. 5 schematically shows part of a second embodiment of the packaging device.
Figure 6:
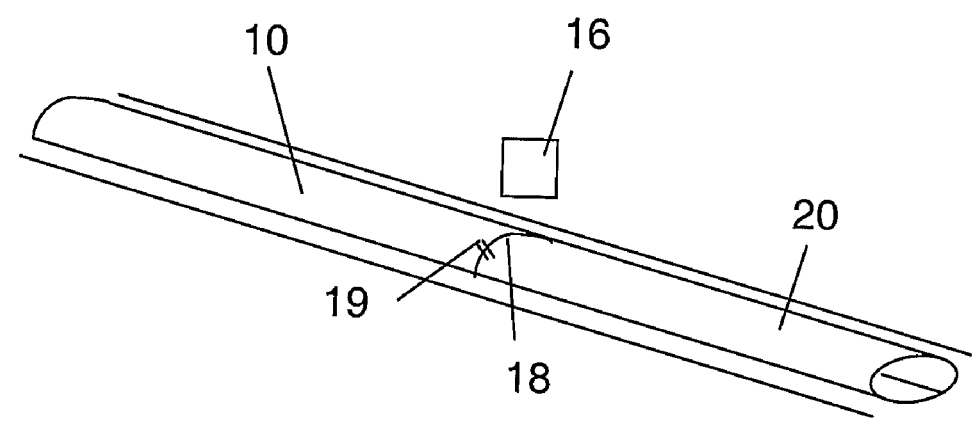
FIG. 6 schematically shows part of a third embodiment of the packaging device.

According to a second embodiment, shown in FIG. 5, the magnetic sensor is arranged to detect a magnetic mark on the flat web of packaging laminate 10, prior to the forming of the packages in the packaging device. The advantage compared to prior art is that the detection can be performed after sterilisation since no contact is made between the packaging laminate 10 and the magnetic sensor 16. According to a third embodiment, shown in FIG. 6, the detection could also be performed on the packaging laminate 10 after it has been formed into a tube 20, but before it has been formed into individual packages.

According to all these embodiments, it is possible to perform the detection closer to the forming of the packages and hence to the discarding of defective packages, which can be performed in the same way in all three embodiments, the difference being that the detection is performed upstream of the forming of the packages in the second and third embodiment, and downstream the forming of the packages in the first embodiment.

It is apparent that the magnetic mark can be detected by the sensor regardless of the state of the packaging laminate: flat, formed into a tube or formed into separate packages.

The information on the position of the magnetic mark 19 is transmitted to the control system of the packaging device in the same way as in prior art. However, the fact that the detection occurs later in the packaging machine greatly enhances the accuracy in identifying the defective packages for discarding.

According to a variant, the information on the position of the magnetic mark could be used when filling the packages with a product. The filling could be interrupted to leave the packages that are deemed to contain a fault empty. As an alternative these packages could be filled with water, so that they can be handled without problems as regards e.g. counter-pressure, in the remaining part of the packaging machine until they are at the point where they are discarded. This would of course reduce the amount of product discarded with the defective packages. The magnetic sensor may be a magneto resistive sensor, GMR sensor or similar. The sensor should be able to sense both static and dynamic fields, so that it is possible detect the presence of a magnetic mark when the package 17 is standing still or moving. The reading distance can be up to a couple of millimeters.

In the first embodiment, the packages could be standing up or lying down when passing the magnetic sensor, and the discarding means could be devised in any way which is suitable to allow controlled sorting out of packages that the magnetic sensor senses have a fault in the packaging laminate.

The invention claimed is;

1. A system for production of a packaging laminate, said laminate including a layer comprising magnetisable particles, wherein the system comprises a scanner arranged to detect a fault in the packaging laminate; and at least one magnetising means activated by the scanner upon detecting a fault for applying a magnetic field for magnetising an amount of the magnetisable particles to make a magnetic mark in the packaging laminate indicative of a location of the fault.

2. A system according to claim 1, wherein the fault detected by the scanner includes single spot defects.

3. A system according to claim 2, wherein said magnetising means is an electromagnet.

4. A system according to claim 1, wherein the magnetising means is a first magnetising means, and further comprising at least one splicing unit for making a splice in the packaging laminate, said at least one splicing unit having a second magnetising means which is arranged to make a magnetic mark indicative of the location of a splice made by the splicing unit.

5. A system according to claim 4, wherein the second magnetising means is a permanent magnet.

6. A packaging device for production of packages made of a packaging laminate produced by the system according to claim 1, comprising a magnetic sensor for sensing the presence of magnetic marks indicative of the fault.

7. A packaging device according to claim 6, further comprising means for discarding a package when the magnetic sensor senses at least one magnetic mark indicative of the fault.

8. A method for production of a packaging laminate, comprising:
   providing the packaging laminate which has a layer comprising magnetisable particles;
   identifying a fault in the packaging material;
   applying a magnetic field to magnetize at least some of the magnetisable particles and make a magnetic mark in the packaging laminate marking a location of the fault; and
   sensing, by a magnetic sensor, the presence of the magnetic mark indicative of the fault.

9. A method for production of packages made of a packaging laminate which is produced according to the method in claim 8, wherein the identification of the fault includes identifying a splice or a single spot defect.

10. A method according to claim 9, further comprising discarding a package when the magnetic sensor senses at least one magnetic mark indicative of a fault.

* * * * *